H. SCHWEITZER.
PREPARATION OF MOLDS FOR DENTAL CASTINGS.
APPLICATION FILED APR. 22, 1912.

1,046,114.

Patented Dec. 3, 1912.

WITNESSES
Francis Ovary
Leonard J. Heiman

INVENTOR
Heinrich Schweitzer

UNITED STATES PATENT OFFICE.

HEINRICH SCHWEITZER, OF NEW YORK, N. Y.

PREPARATION OF MOLDS FOR DENTAL CASTINGS.

1,046,114.      Specification of Letters Patent.      Patented Dec. 3, 1912.

Application filed April 22, 1912. Serial No. 692,274.

*To all whom it may concern:*

Be it known that I, HEINRICH SCHWEITZER, a subject of the German Emperor, residing in New York, in the county and State of New York, have invented Improvements in the Preparation of Molds for Dental Castings, of which the following is a specification.

This invention relates to a class of molds with an uncovered tapering surface for dental castings such as are described by myself in a copending application for Letters Patent Serial No. 671,678 filed January 17th, 1912 for "pressure tools for dental castings."

The method of preparing such molds and the molding flask used for the preparation are the main objects of my present application.

While it was suggested in my above named application Serial No. 671,678 to make use of molds for dental castings with no metal surrounding it at all it is sometimes desirable to have the upper part of the mold protected by a metal ring. In either case the molds described by myself have an uncovered tapering end as it is shown in the accompanying drawing.

Figure 1:
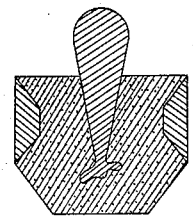
Figure 2:
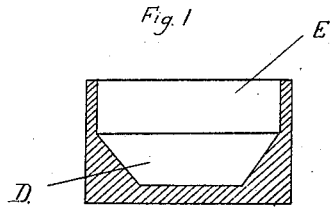
Figure 3:
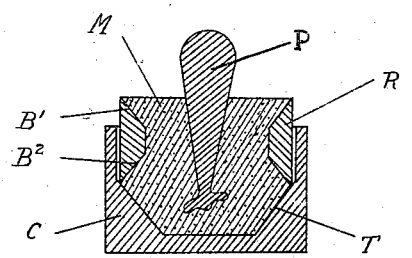
Figure 4:
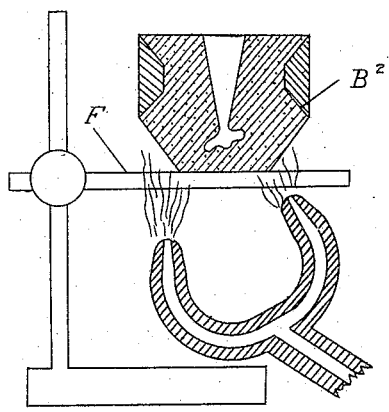
Figure 5:
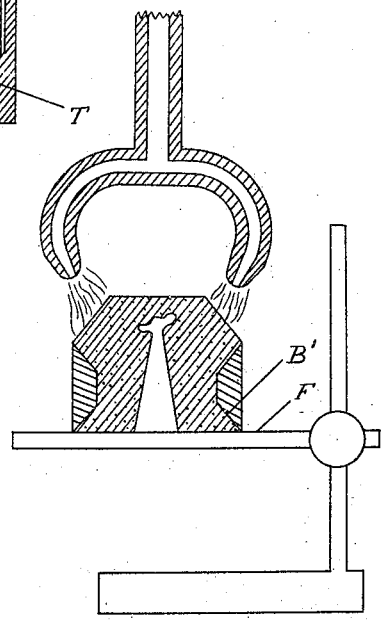

Figure 1, is a vertical section through a mold surrounded by a flask ring in its superior part. Fig. 2 shows in section the flask cup in which the shape of the tapering end of the mold is formed. Fig. 3 is a sectional view of a mold surrounded in the upper part by a flask ring and resting in the tapering surface of the molding cup. Fig. 4, showing the mold in vertical section upon a heating frame, explains the way of melting out the casting pattern by heating the mold from below. Fig. 5, indicating the reversed mold in vertical section upon a heating frame, shows the application of heat upon the mold from above.

A mold with an uncovered tapering end for dental castings is obtained by building it up in a molding flask. The molding flask consists of a base part, C, with a cup shaped depression in which a flask ring is positioned. The lower part of the depression, D, preferably of conical shape tapers toward the bottom, and the upper part, E, is made of any suitable shape that allows the resting of the lower end of the flask ring, R, upon the tapering part, T, of the base part of the molding flask C. The flask ring, R, is beveled at both ends toward the center by the beveled surfaces $B^1$ and $B^2$.

In the preparation of a mold with an uncovered tapering end I proceed as follows: I cover the tapering surface, T, of the base part of the cup, C, with a lubricating material, then I first fill the tapering depression, D, with liquefied investment material, whereupon, after having placed the flask ring, R, over the tapering depression, I pour additional investment material into the flask ring, while at the same time I sink the casting pattern, P, into the soft batter of the mold investment, M. I separate the mold from the base part of the flask after the investment material—usually a mixture of plaster of Paris with other substances and water—has set by pulling the flask ring, R, together with the mold out of the depression of the cup, C. Then I place the mold upon a heating frame, F, and heat it from below as illustrated in Fig. 4, or from above as illustrated in Fig. 5, preferably by means of converging flames until all traces of the casting pattern are melted and expelled from the mold.

The beveled surfaces $B^1$ and $B^2$ of the flask ring serve as a double anchorage of the flask ring upon the mold; this is of great value if force is exercised upon the mold in its removal from the cup and in the heating process where the falling off of the expanded flask ring is prevented.

Having now fully described my invention, I claim:

Molding flask for the preparation of molds with an uncovered tapering end surface for dental castings and the like, consisting of a cup shaped base having a tapering depression in its bottom part for the formation of the shape of the tapering part of the mold and a flask ring, beveled in both ends toward the inside, fitting over the tapering part of the cup depression, said flask ring forming the shape of the upper part of the mold substantially as described and shown.

HEINRICH SCHWEITZER.

Witnesses:
JOHN P. DAVIS,
WINFRED N. LURCOTT.